A. MEKENNEY.
Carriage for Spreading Manure.

No. 208,029.  Patented Sept. 17, 1878.

WITNESSES
E. W. Newton
Frank J. Parker

INVENTOR
Alendo Mekenney
By his attorney
J. L. Newton

UNITED STATES PATENT OFFICE.

ALENDO MEKENNEY, OF MIDDLEBOROUGH, MASSACHUSETTS.

IMPROVEMENT IN CARRIAGES FOR SPREADING MANURE.

Specification forming part of Letters Patent No. 208,029, dated September 17, 1878; application filed December 28, 1877.

*To all whom it may concern:*

Be it known that I, ALENDO MEKENNEY, of Middleborough, in the State of Massachusetts, have invented an Improved Carriage for Spreading or Depositing Manure and Fertilizing Substances, of which the following is a specification.

The invention consists of a two-wheeled carriage bearing on its axle between said wheels a receptacle for manure or any fertilizing substance, for the purpose of spreading or depositing the same on fields or grass-lands.

The receptacle is a cylinder or drum, which is made of staves running from end to end, part movable, in two drums, one sliding above the other, whose alternate staves together constitute the receptacle, and said staves in said two drums are so arranged that by sliding the outer drum over the inner drum openings between said staves will be made, so as to let fall the fertilizing substance in a greater or less quantity, as may be desired. The axle has knives set in it on all its sides at right angles to the axle, for the purpose, on the revolution of the receptacle, of cutting up and making finer the manure. Both of the drums have tires at their outer edges, the outer fastened to the staves, the inner fastened to the drum-heads. The tires to the drum-heads have on their outer edges teeth, into which play ratchets which are fastened to the wheels. One of the staves is in two parts, and each part is hinged to the inner side of each drum-head for the purpose of an opening to load the receptacle.

The invention has for its object a machine into the receptacle of which manure may be placed, and by the revolution of which the manure will be pulverized, and at the same time dropped or deposited on fields or grass-lands.

Figure 1:
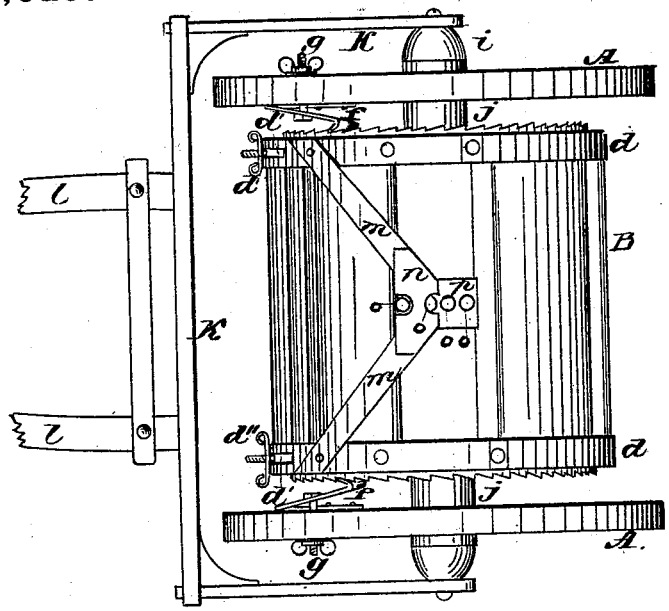

The accompanying drawing, which is made a part of this specification, will fully show the invention, in which drawing Figure 1 is a perspective view of the carriage.

The wheels (designated A A) are straight, allowing the receptacle to hang near the wheels. B represents the receptacle as a whole, and is composed of the outer drum, C, and the inner drum, D. (Shown more fully in Fig. 3.) $d\ d$ represent the tires of the outer drums; $d'\ d'$, slots in the tires, and $d''\ d''$ nuts and screws. There are four corresponding slots in the two tires. By loosening the nuts of the screws the two adjacent staves in the outer drum through which the screws pass can be moved either way independently of the outer drum, and the drum itself can be moved the same distance, which is about half the width of a stave. The staves of the inner drum, D, are made fast to the inner side of the drum-heads, and the tires of the inner drum project beyond the heads of the drum, and are toothed. Into the teeth play the ratchets $f\ f$, and said ratchets are made fast to the wheels by screws. When the ratchets are made fast to the teeth, as shown in Fig. 1, the revolution of the wheels causes the revolution of the receptacle; but by tightening the screws the ratchets will be separated from the teeth, and the receptacle will remain stationary while the wheels revolve.

$m\ m$ are braces having a strengthening-piece, $n$, which has semicircular slots on either side of it. $o\ o$, &c., are holes in the plate $p$. By the use of these several parts designated by the letters $m\ m$, $n$, $o\ o$, &c., and $p$, a small bar or lever may be inserted in the holes $o\ o$, &c., using the plate $p$ as a fulcrum. The outer drum, C, is made to slide back and forth on the inner drum, D, for the purpose of making longitudinal openings between the staves of the two drums, and these openings may be wider or narrower, according as the fertilizing substance is coarse or fine, or larger or smaller quantities are needed to be deposited on the field.

Fig. 1 also shows the method of hauling the carriage, whether by hand or by horse.

Figure 2:
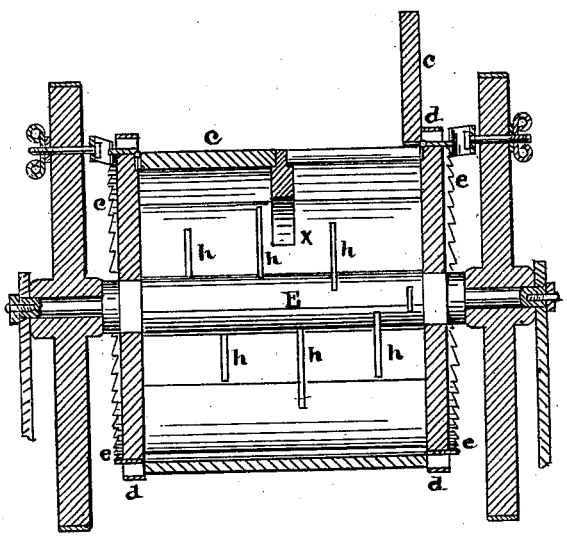

Fig. 2 is a longitudinal and horizontal section of Fig. 1, showing sections of the wheels, the screw, and the ratchet held by the screw, the teeth of the tires of the inner drum, the axle as it passes through the hubs, and its shape within the receptacle, and the knives inserted in the axle; also the opening into the receptacle for loading the same, formed by a stave of the inner drum, D, divided in two parts, $c\ c$. These two parts of the stave are each hinged to the inner sides of the drum-heads, and open outward, as shown in said Fig. 2. When closed, said parts of stave rest on a circular brace, $x$, within the receptacle shown in both Figs. 2 and 3.

Figure 3:
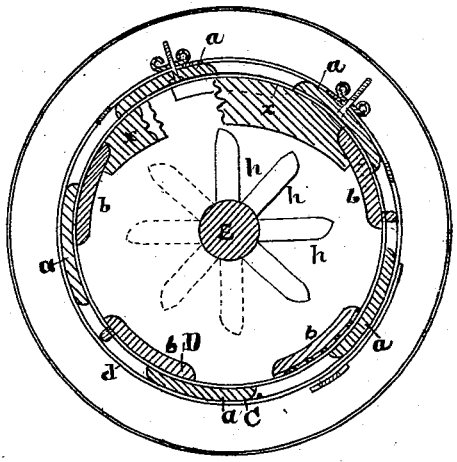

Fig. 3 is a vertical cross-section of Fig. 1 near its center, and shows one wheel, a section of the axle, the knives, a section of the staves of drum C and drum D, and their positions in reference to each other when there are openings between them, and as they are to be used in depositing manure, also the screws and nuts and slots in the tire of the outer drum, and portions of the circular brace $x$, which supports the ends of the divided stave $c\ c$.

Having described the parts of my invention in detail, I will further explain its practical operation. By forming a toothed tire on the periphery of the inner drum-head, the teeth projecting from the tire of the drum-head, and placing the ratchet on a part of the wheel corresponding, as above shown, instead of having the ratchet and teeth at or near the axle, I have greatly lessened the power necessary to revolve the loaded receptacle in hauling the carriage. By having knives set in the axle and revolving the receptacle, as described, the coarsest manure will be reduced to fineness necessary for spreading or depositing in fields. By forming the revolving receptacle composed of two drums, one partially sliding over the other to make openings between the staves, for the purpose of dropping fertilizing substances in even quantities upon fields, I have made a machine for this purpose of great practical value to farmers and gardeners, which has been fully tested.

I am aware that in this class of inventions a large number of patents has been issued, some of them embracing devices similar in some respects to what I have described in my invention; but the same do not show the combination of the axle and the drums C and D, having movable staves, one drum sliding partly over the other, and the two together constituting a receptacle; nor do they show the combination of the said drums, one of them having a toothed tire, into the teeth of which play ratchets fastened to the wheels, as shown, together with the wheels; nor the combination of the axle carrying knives within the receptacle, together with the receptacle, ratchet, and wheels operating together; nor the combination of the said drums having devices for the purpose of moving the same back and forth one over the other, the contrivances for moving and fastening the staves and the combination of the parts described forming an opening for the purpose of loading the receptacle. These combinations of parts are new and serve a useful purpose.

What I claim as my invention, and desire to secure by Letters Patent, is—

1. The combination of the axle E, the drum D, on which slides the drum C, having slotted tires $d\ d$ and fastenings $d''\ d''$, substantially in the manner and for the purpose shown and described.

2. The combination of the axle E, the drum C, and the drum D, having toothed tires $e\ e$, the ratchets $f\ f$, fastened to the wheels A A, and the wheels A A, substantially as and for the purposes shown and described.

3. The combination of the axle E, provided with knives within the receptacle B, and the receptacle B, the ratchets $f\ f$, fastened to the wheels A A, and the wheels A A, substantially as shown and for the purposes described.

4. The combination of the drum D and the drum C, having cross-pieces $m\ m$ fastened to its tires and staves, the cap $n$, provided with semicircular slots, and the plate $p$, fastened to a stave in the drum D, having holes therein, for the purpose shown and described.

5. The combination of the hinged staves $c\ c$, the drum D, and the circular brace $x$, substantially as and for the purpose shown and described.

ALENDO MEKENNEY.

Witnesses:
 EVERETT ROBINSON,
 L. P. BROWN.